United States Patent [19]

King et al.

[11] Patent Number: 4,621,760
[45] Date of Patent: Nov. 11, 1986

[54] METHOD OF PRODUCING A FRICTION WELDED ARTICLE

[75] Inventors: Wendell B. King, Bluffton; Ronald I. Rhoads, Fort Wayne; Robert H. Tarbox, Huntertown, all of Ind.

[73] Assignee: Dana Corporation, Toledo, Ohio

[21] Appl. No.: 753,315

[22] Filed: Jul. 9, 1985

[51] Int. Cl.[4] .................. B23K 20/12; B23K 20/24
[52] U.S. Cl. .................. 228/112; 228/113; 228/114
[58] Field of Search .................. 228/112–114

[56] References Cited

U.S. PATENT DOCUMENTS 3,576,067 4/1971 Loyd .................. 228/113
3,949,466 4/1976 O'Brien et al. .................. 228/113

FOREIGN PATENT DOCUMENTS 229634 10/1963 Austria .................. 228/112
86692 6/1980 Japan .................. 228/112
62687 5/1981 Japan .................. 228/112

Primary Examiner—Nicholas P. Godici
Assistant Examiner—Samuel M. Heinrich
Attorney, Agent, or Firm—Marshall & Melhorn

[57] ABSTRACT

The present invention relates to a method of friction or inertia welding first and second metal components wherein one of the components is provided with an interface surface having a generally convex configuration, and the central portion of the convex-shaped surface is provided with an axially extending raised button. The convex-shaped surface and the raised button are simultaneously formed during a forging operation. The raised button ensures that, during the friction welding operation, the initial contact and friction heat build up will occur at the center of the interface surfaces.

6 Claims, 3 Drawing Figures

METHOD OF PRODUCING A FRICTION WELDED ARTICLE

BACKGROUND OF THE INVENTION

The present invention relates, in general, to a method of friction or inertia welding and, in particular, to a method of friction welding wherein the interface surfaces between two solid metal components to be friction welded are uniquely shaped.

Friction welding is a well known process wherein two or more metal or plastic components can be joined together by using heat generated by friction as the components are rubbed against each other to produce a welded joint. In friction welding, two metal components to be joined together are moved either relatively rotationally or reciprocally with respect to one another and, simultaneously, are pressed against each other until sufficient heat is generated by friction between the components to produce the friction welded joint.

Generally, the relatively moving surfaces of the components at which the friction welded joint is to be produced are matched in shape with one another. In most cases, such surfaces are planar and parallel to one another. However, in some instances, it is desirable to shape the interface surfaces of the components to be joined to control the initial contact between the interface surfaces such that the frictional heat produced is initially concentrated at certain areas of the interface surfaces. For example, in U.S. Pat. No. 3,762,030, the interface surface of a first metal component to be joined to a second metal component is provided with a depression so that the initial contact between the interface surfaces will be at the peripheral areas of such surfaces. It has been found that such a configuration is desirable when welding one component having hot strength properties greater than that of a second component.

In other friction welding methods, the interface surfaces of one of the components is provided with a convex-shaped interface surface such that initial contact occurs and frictional heat builds up at the central contact area. For example, in friction welding a forged yoke component to an associated bar stock of a predetermined length to produce a vehicle axle shaft assembly, it has been found desirable to shape the interface surface of the yoke in a conical-shaped configuration having a relatively small radial draft. However, it is difficult to produce such a conical-shaped surface during the forging operation of the yoke since, due to the inherent die shift during the forging operation, the apex on the conical-shaped interface surface produced by the forging is not always located at the center of the interface surface. Thus, in order to produce a proper weld joint without any cold spots located in the central area, it has been found that the conical-shaped interface surface of the yoke forging should be qualified by a separate machine operation prior to the friction welding operation.

SUMMARY OF THE INVENTION

The present invention relates to a unique method for friction or inertia welding two metal components wherein the interface surface of one of the components is shaped during a forging operation in such a manner to ensure that the initial contact between the interface surfaces of the two components occurs at the central area thereof, thereby causing the initial frictional heat buildup to occur in this area.

More specifically, the interface surface of the first component is shaped in a generally convex configuration relative to a plane located perpendicular to the welding axis, while the interface surface of the second component is substantially planar and perpendicular to the welding axis. In accordance with the present invention, the central portion of the convex-shaped interface surface is provided with a raised button extending axially outwardly a predetermined distance from the convex shaped interface surface. Such a construction can be produced by a forging operation and ensures that, during the friction welding operation, the initial contact between the interface surfaces of the first and second components will occur in the central area, thereby producing a sound weld joint. In the preferred embodiment of the invention, the method is utilized to weld a yoke forging to an associated bar stock member to produce a vehicle axle shaft assembly.

DESCRIPTION OF THE PREFERRED EMBODIMENT

Figure 1:
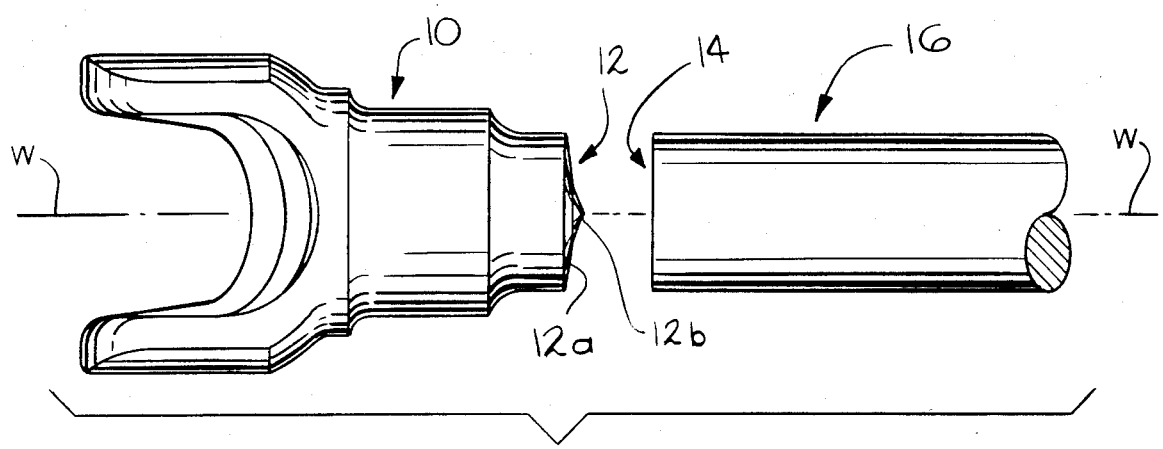
FIG. 1 is a side elevational view illustrating two components which are to be frictionally welded together and have their interface surfaces positioned in spaced apart facing relationship with one another.

Referring to the drawings, and particularly to FIG. 1, there is illustrated two components which are adapted to be frictionally welded to one another according to the method of the present invention. In particular, the components include a forged yoke component 10 having an interface surface 12 which is adapted to be frictionally welded to an interface surface 14 of a bar stock component 16 to produce an axle shaft for an associated vehicle. Both the yoke 10 and the bar stock 16 can be constructed of SAE 1040 steel, for example.

It will be appreciated that, while the present invention is specifically described and illustrated with respect to joining a forged yoke unit to an associated bar stock, it will be readily apparent that the method of the present invention can be utilized in friction welding two metal components together to be utilized in other applications. It should be noted that the term friction welding as used herein includes both conventional friction-type welding, wherein the associated components are typically directly driven by a motor drive assembly, and inertia-type welding, wherein the associated components are driven by a flywheel arrangement.

In FIG. 1, the interface surface 12 of the yoke 10 which is to be frictionally welded to the interface surface 14 of the bar stock 16 is provided with a generally convex shaped portion 12a having a raised button 12b provided at the center thereof. The interface surface 14 of the bar stock 16 is generally planar and perpendicular to a welding axis W. During the frictional welding operation, the yoke 10 is rotated relative to the bar stock 16 about the welding axis W, and the two components are pressed together with a force sufficient to generate frictional heat adequate to weld the metal components at their interface surfaces. The raised button 12b of the present invention ensures that the initial contact and the initial heat will be generated at the center of the interface surfaces, thereby producing a sound weld.

Figures 2, 3:
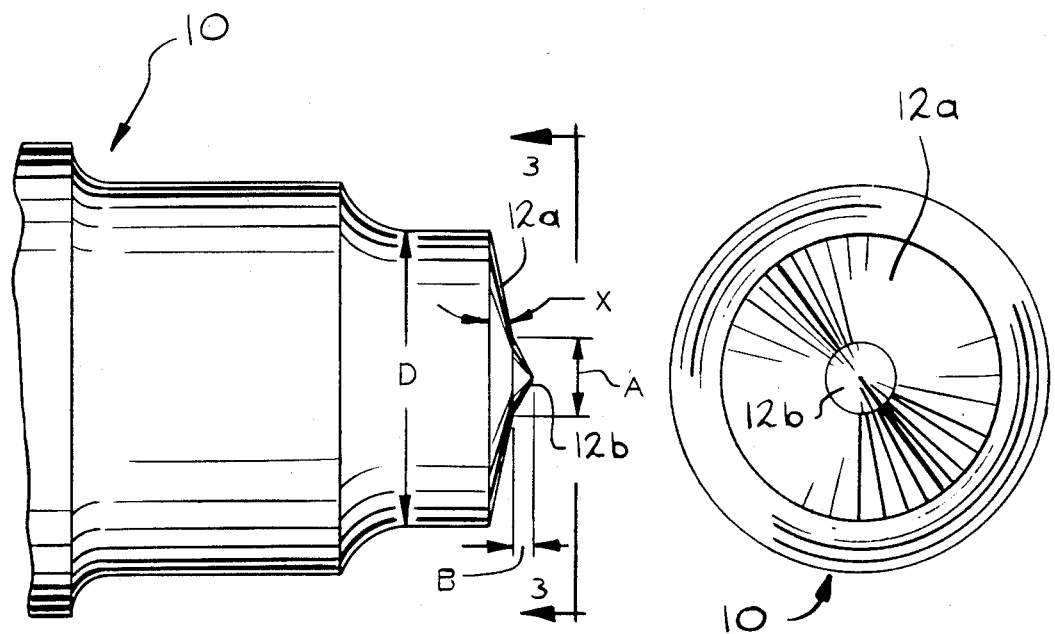
FIG. 2 is an enlarged side elevational view of the interface surface of one of the components which is shaped in a manner according to the present invention.
FIG. 3 is an end elevational view taken along the line 3—3 of FIG. 2.

Referring to FIGS. 2 and 3, there are shown enlarged side and end elevational views of the yoke forging used in the method of the present invention. Preferably, both the convex-shaped surface 12a and the centrally located raised button 12b are formed during a single forging operation. By forging the raised button simultaneously with the convex-shape surface 12a, the need for a separate machining operation is eliminated.

In the preferred embodiment of the yoke, the end of the yoke 10 is formed of a diameter D which can be approximately 41 millimeters. The diameter A of the raised button 12b can be approximately 12.5 millimeters, and the distance B which is the axial length of the button 12b can be approximately three millimeters. Also, the radial draft X of the surface 12a can be approximately seven degrees with respect to a plane perpendicular to the welding axis W.

It should be noted that the present invention has been illustrated and described in what is considered to represent the preferred embodiment. However, it should be understood that the invention may be practiced otherwise than as specifically illustrated and described without departing from the scope of the attached claims.

What is claimed is:

1. A method of friction welding first and second metal components about a welding axis, the first component having an interface surface to be positioned in facing relation to an interface surface provided on the second component, said method comprising the steps of:
   (a) shaping the interface surface of the first component in a generally convex configuration relative to a plane located perpendicular to the welding axis;
   (b) providing the central portion of said convex-shaped interface surface with a raised button extending axially outwardly a predetermined distance from said convex-shaped interface surface;
   (c) positioning the interface surface of the first component in spaced apart, facing relationship with the interface surface of the second component; and
   (d) friction welding the first and second components at their interface surfaces.

2. The method according to claim 1 wherein steps (a) and (b) are performed simultaneously.

3. The method according to claim 2 wherein steps (a) and (b) are performed by a forging operation.

4. The method according to claim 1 wherein the interface surface of the second component is generally planar and perpendicular to the welding axis.

5. A method of producing an axle shaft assembly comprising the steps of:
   (a) forging a yoke having an interface surface with a generally convex configuration relative to a plane located perpendicular to a welding axis, the central portion of the convex-shaped interface surface provided with a raised button extending axially outwardly a predetermined distance from the convex-shaped interface surface;
   (b) positioning a planar interface surface of a predetermined length of bar stock in spaced apart, facing relationship with the interface surface of the yoke; and
   (c) friction welding the yoke and the bar stock at their interface surfaces to produce the axle shaft assembly.

6. A first metal component having a welding axis and an interface surface adapted to be friction welded to an interface surface provided on a second metal component, said interface surface of said first component having a generally convex configuration relative to a plane located perpendicular to the welding axis, said convex-shaped interface surface having a central portion provided with a raised button extending axially outwardly a predetermined distance from said convex-shaped interface surface.

* * * * *